Dec. 16, 1947. F. J. O'BRIEN, JR., ET AL  2,432,788
SOLDER WIPER FOR CAN BODY MAKERS
Filed July 24, 1944

Inventor
Frank J. O'Brien Jr.
Hans Gehrmann
By Mason, Porter & Diller
Attorneys

Patented Dec. 16, 1947

2,432,788

UNITED STATES PATENT OFFICE 2,432,788

SOLDER WIPER FOR CAN BODY MAKERS

Frank J. O'Brien, Jr., and Hans Gehrmann, Syracuse, N. Y., assignors to Continental Can Company, Inc., New York, N. Y., a corporation of New York Application July 24, 1944, Serial No. 546,242

1 Claim. (Cl. 113—97)

The invention relates to new and useful improvements in a solder wiper for a can body soldering machine.

An object of the invention is to provide a means for removing the solder collected by the wiping roll so as to prevent the can from scooping up loose pellets of solder on the roll so as to reduce to a minimum solder thrown by the roll into the path of movement of the can bodies.

A further object of the invention is to provide a wiper roll with a scraper rotating about the periphery of the wiper roll in contact therewith and in a direction opposite to the rotation of the wiper roll.

These and other objects will in part be obvious and will in part be hereinafter more fully disclosed.

In the drawings—

Figure 1:
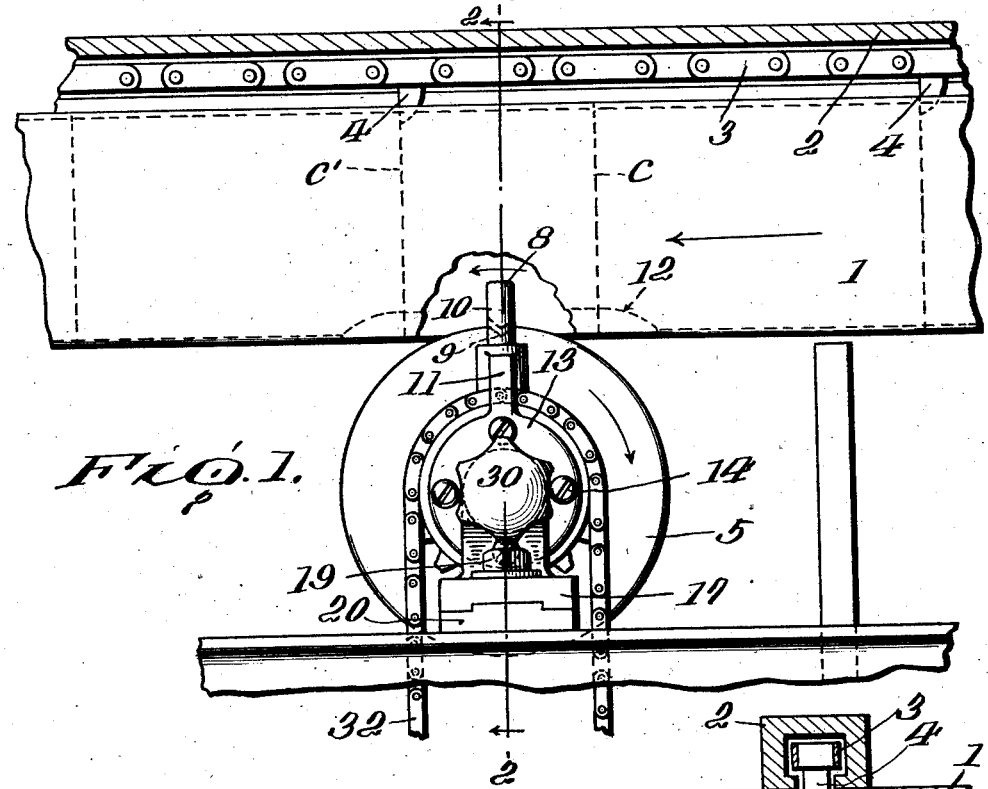
Figure 1 is a view partly in section and partly in side elevation showing a can seaming wiping mechanism with the improved means for removing the solder clinging thereto.

It is a common practice to provide a wiper roll in conjunction with a soldering mechanism which wiper roll contacts with the solder bonded side seam for removing solder adhering to the outer face of the can body in the region adjacent the side seam. Such a wiper roll is particularly necessary in connection with a Jensen type of solder applying mechanism wherein a solder roll rotating in a bath of solder is so positioned relative to the path of travel of the can bodies that the can body in the region of the side seam receives solder from the roll. While much of the solder is sweated into the side seam, solder does, however, adhere to the can body in the region adjacent the side seam, and the purpose of the wiper roll is to remove this solder adhering to the can body.

The wiper roll is usually made of layers of fiber material and the periphery of the roll is shaped to conform to the curvature of the can body. The wiper roll is so disposed relative to the solder horse along which the can bodies pass after leaving the soldering mechanism as to contact with the side seam of the can body. The solder horse has a slot at the lower side thereof so that the side seam can be presented to the soldering mechanism and also to the wiper roll. This wiper roll and its mode of operation is of the usual type. Cooperating with this wiper roll is a scraper which is mounted for movement about the axis of rotation of the wiper roll. The scraper is shaped to conform to the periphery of the wiper roll in cross section and contacts with the periphery at all times. It is rotated about the wiper roll and moves in a direction opposite to the direction of rotation of the wiper roll and thus the solder accumulating on the wiper roll is stripped therefrom.

Referring more in detail to the drawings, the solder horse along which the can bodies travel is indicated at 1 in the drawings. The solder horse is in two sections, the inner faces of the two sections being shaped to conform to the cylindrical shape of the can body which is to be soldered. Mounted on the solder horse sections is a guide or housing 2 for a conveyor chain 3. The conveyor chain 3 is provided with lugs 4, 4 at spaced intervals which engage the can bodies and move them through the horse.

Figure 2:
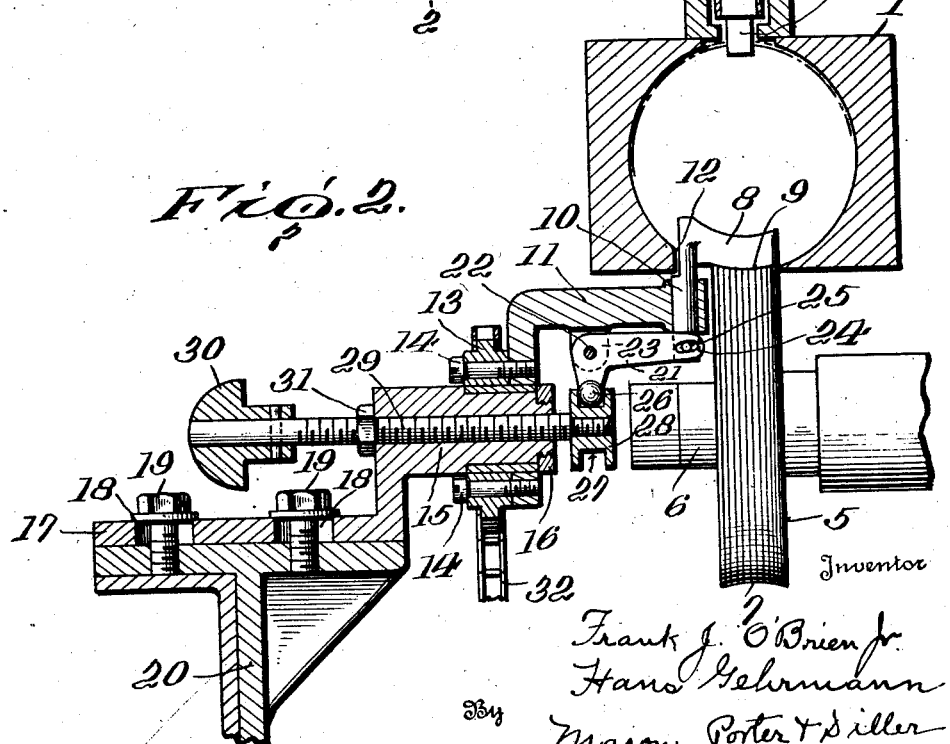
Figure 2 is a sectional view on the line 2—2 of Figure 1.

The wiper roll is indicated at 5. It is carried by a shaft 6 mounted in suitable bearings and rotated in the usual manner. The can bodies travel in the direction of the arrow in Figure 1, that is, from right to left through the solder horse. The wiper roll rotates in a clockwise direction so that the portion of the wiping roll which contacts with the can body travels in the direction opposite to the movement of the can body side seam. As noted above, the wiper roll 5 has its periphery 7 shaped so as to conform in general to the cylindrical shape of the can body. Associated with the wiper roll is a scraper 8. Said scraper contacts with the periphery of the wiper roll. The under face 9 of the scraper 8 is curved so as to conform generally to the curvature of the wiper roll 5. This scraper 8 is carried by a supporting shank 10 mounted in a bracket arm 11 so that it can be moved out and in on said arms. The section of the horse at the left as viewed in Figure 2 is cut away at 12 so as to provide a clearance for the movement of the scraper as it travels about the wiper roll. The arm 11 in which the scraper shank is mounted is bolted to a sprocket wheel 13 by suitable bolts 14 and the sprocket wheel and bracket arm are rotatably mounted on a supporting stud 15. A threaded collar 16 retains the sprocket wheel and arm on the stud. This stud 15 is carried by a supporting bracket 17 which is provided with slots 18, 18 through which the bolts 19, 19 pass for clamping the same to the frame 20 of the machine. These slots 18 are elongated and permit a limited endwise adjustment of the bracket on the frame which facilitates the positioning of the scraper laterally of the rotating wiper roll 5.

Mounted on the supporting arm 11 is a lever

21. Said lever is pivoted at 22 to a lug 23 carried by the under side of the arm 11. The outer end of the lever 21 is provided with a slot 24 in which a pin 25 carried at the lower end of the shank 10 is located. The other end of the lever 21 is provided with a ball stud 26 engaging the groove 27 in a collar 28 mounted on the outer end of a shaft 29. This shaft 29 extends through a threaded opening in the stud 15 and has threaded connection therewith. Mounted on the outer end of the shaft 29 is a hand knob 30 by which the shaft may be rotated. The shaft is secured in set positions by means of a lock nut 31.

A sprocket chain 32 runs over the sprocket wheel 13 and causes the arm 11 to rotate about the axis of the stud 15 and this axis of the stud 15 is in alignment with the axis of rotation of the wiper roll. The scraper is set so as to contact with light pressure against the periphery of the fiber wiper roll. As the roll wears the shaft 29 can be adjusted so as to maintain a proper engagement between the scraper and the wiper roll.

The timing of the rotations of the scraper about the periphery of the wiper roll is synchronized with the movements of the can bodies so that the scraper passes over the top of the wiper roll between the passing of the can bodies. In Figure 1 there is indicated in dotted lines two can bodies C and C'. These can bodies are spaced and the scraper passes over the top of the wiper roll in this spacing between the two can bodies. As has already been noted, the wiper roll rotates in a clockwise direction and the scraper rotates in a counter-clockwise direction. The under face of the scraper is shaped so as to provide more or less of a blunt edge, as indicated at 9 in Figure 1 of the drawings.

The wiper roll contacting with the outer face of the can body in the region where solder has been applied thereto, will remove the greater portion of the solder from this outer surface of the can. Some of the solder will form into pellets which do not travel around with the wiper, but bounce around on the upper portion thereof. The scraper will remove these pellets so that they will not be scooped up by the oncoming can body. Some of the solder will cling to the wiping roll and some of the pellets will be carried around with the wiping roll and will be thrown from the wiping roll into the path of the oncoming body. The scraper, however, will remove the greater portion of this solder accumulating on the wiper roll so that little or no solder will be picked up by the oncoming can body.

It is obvious that many changes may be made in the details of construction without departing from the spirit of the invention as set forth in the appended claim. It is essential, however, that the scraper shall contact with the periphery of the wiper roll and move about the same in a direction opposed to the direction of the wiper roll.

We claim:

The combination of a solder horse, a conveying means for moving can bodies along the horse in spaced relation, a wiper roll contacting with the can bodies in the region of the side seam thereof for removing surplus solder therefrom, means for rotating the wiper roll in a direction opposed to the direction of movement of the can bodies, a scraper extending laterally across the peripheral face of the wiper roll and shaped to conform with said face, said scraper being positioned so as to contact with the peripheral face of the wiper roll, means for rotating the scraper about an axis in alignment with the axis of the wiper roll and in a direction opposed to the direction of rotation of the wiper roll whereby the scraper will contact with the entire periphery of the roll for removing solder accumulating thereon, said rotating means for the scraper being timed so as to move over the high point of the wiper roll at a time when the wiper roll is out of contact with the passing can bodies.

FRANK J. O'BRIEN, Jr.
HANS GEHRMANN.

REFERENCES CITED

The following references are of record in the file of this patent:

UNITED STATES PATENTS

| Number | Name | Date |
| --- | --- | --- |
| 1,508,077 | Taylor | Sept. 9, 1924 |
| 2,161,839 | Woolford | June 13, 1939 |